(12) United States Patent
Lush et al.

(10) Patent No.: US 11,568,433 B2
(45) Date of Patent: Jan. 31, 2023

(54) PREDICTIVE CHANGE FOR REAL ESTATE APPLICATION

(71) Applicant: CARRIER CORPORATION, Palm Beach Gardens, FL (US)

(72) Inventors: Jonathan Lush, Salem, OR (US); Debbie Bell, Monmouth, OR (US); Jeff Antrican, Salem, OR (US); Teri Lynne Briskey, Monmouth, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 226 days.

(21) Appl. No.: 16/613,272

(22) PCT Filed: Apr. 19, 2018

(86) PCT No.: PCT/US2018/028282
§ 371 (c)(1),
(2) Date: Nov. 13, 2019

(87) PCT Pub. No.: WO2018/212898
PCT Pub. Date: Nov. 22, 2018

(65) Prior Publication Data
US 2020/0143402 A1   May 7, 2020

Related U.S. Application Data

(60) Provisional application No. 62/507,015, filed on May 16, 2017.

(51) Int. Cl.
*G06Q 30/02* (2012.01)
*G06F 16/26* (2019.01)
(Continued)

(52) U.S. Cl.
CPC ....... *G06Q 30/0206* (2013.01); *G06F 3/0482* (2013.01); *G06F 16/26* (2019.01); *G06Q 50/16* (2013.01)

(58) Field of Classification Search
CPC .............. G06Q 30/0206; G06Q 50/16; G06Q 30/0202; G06Q 30/02; G06F 16/26;
(Continued)

(56) References Cited

U.S. PATENT DOCUMENTS 5,361,201 A   11/1994  Jost et al.
6,401,070 B1   6/2002  McManus et al.
(Continued)

FOREIGN PATENT DOCUMENTS

WO       2017002299 A1    1/2017

OTHER PUBLICATIONS

Supra, "BrokerBay Brochure", May 16, 2013, Supra, pp. 1-4 (Year: 2013).*

(Continued)

*Primary Examiner* — Sarah M Monfeldt
*Assistant Examiner* — Michael J. Monaghan
(74) *Attorney, Agent, or Firm* — Bachman & LaPointe, P.C.

(57) ABSTRACT

A method for setting or adjusting a sale price for a subject real estate listing including receiving data regarding a subject real estate listing from a handheld device operating a predictive showing change application. The data regarding the subject real estate listing is compared with a multiple of comparable real estate listings and an output that compares a number of showings for a suggested price of the subject real estate listing compared to a number of showings based on the multiple of comparable real estate listings is determined.

18 Claims, 7 Drawing Sheets

(51) Int. Cl.
*G06F 3/0482* (2013.01)
*G06Q 50/16* (2012.01)

(58) Field of Classification Search
CPC ...... G06F 3/0482; G06F 3/0481; G06F 3/048; G06F 3/04
See application file for complete search history.

(56) References Cited

U.S. PATENT DOCUMENTS

| | | | |
|---|---|---|---|
| 6,624,742 B1* | 9/2003 | Romano | G09F 9/00 340/5.1 |
| 8,433,650 B1* | 4/2013 | Thomas | G06Q 40/02 705/38 |
| 8,515,839 B2 | 8/2013 | Ma et al. | |
| 8,650,067 B1* | 2/2014 | Moss | G06Q 30/0201 705/7.29 |
| 10,380,653 B1* | 8/2019 | Flint | G06Q 30/0278 |
| 2008/0281829 A1* | 11/2008 | Marino | G06Q 50/16 |
| 2008/0301064 A1 | 12/2008 | Burns | |
| 2009/0030718 A1* | 1/2009 | Bengson | G07C 11/00 340/5.65 |
| 2009/0153291 A1* | 6/2009 | Larson | G07C 9/00817 340/5.33 |
| 2010/0161498 A1 | 6/2010 | Walker et al. | |
| 2011/0066561 A1* | 3/2011 | Lazarre | G06Q 50/16 705/313 |
| 2011/0251974 A1 | 10/2011 | Woodard et al. | |
| 2012/0072357 A1 | 3/2012 | Bradford et al. | |
| 2012/0323587 A1 | 12/2012 | Llosa | |
| 2013/0325606 A1* | 12/2013 | Balduf | G06Q 30/02 705/14.66 |
| 2013/0339255 A1 | 12/2013 | Taibird et al. | |
| 2014/0006083 A1* | 1/2014 | Bengson | G06Q 10/1095 705/7.19 |
| 2014/0258042 A1* | 9/2014 | Butler | G06Q 50/16 705/26.63 |
| 2014/0304178 A1* | 10/2014 | Bengson | H04W 4/021 705/313 |
| 2015/0170299 A1 | 6/2015 | Wilson et al. | |
| 2015/0193797 A1 | 7/2015 | Gerrity | |
| 2015/0242747 A1 | 8/2015 | Packes et al. | |
| 2015/0269264 A1* | 9/2015 | Bolen | G06Q 30/0627 705/26.63 |
| 2016/0042479 A1* | 2/2016 | Oertli | G06F 16/2358 705/313 |
| 2016/0180621 A1* | 6/2016 | Desinor, Jr. | G07C 9/00309 340/5.61 |
| 2016/0314545 A1 | 11/2016 | Jessen | |
| 2016/0364929 A1* | 12/2016 | Fisher | G07C 9/00309 |
| 2017/0193616 A1* | 7/2017 | Marshall | G06Q 30/0627 |
| 2017/0200243 A1* | 7/2017 | Morgan | G06Q 50/01 |
| 2018/0082388 A1 | 3/2018 | Takamatsu et al. | |
| 2018/0225783 A1* | 8/2018 | Martin | G06Q 50/16 |

OTHER PUBLICATIONS

Pro Agent Solutions, "Showing Feedback for Realtors", Nov. 8, 2016, Pro Agent Solutions, pp. 1-12 (Year: 2016).*
International Search Report dated Jul. 3, 2018 issued for PCT/US2018/028282.
http://onlinelibrary.wiley.com/doi/10.1111/1540-6229.00038/full.

* cited by examiner

PREDICTIVE CHANGE FOR REAL ESTATE APPLICATION

BACKGROUND

The present disclosure relates generally to a real estate communication system, and more particularly, to a system and method to predict a number of showings based on a change in price to facilitate sales by listing agents and sellers.

In the real estate industry, there exists significant activity relating to the sale of a home that is based on agent knowledge. Typically, home sellers start the process of setting a price for their property based off emotions and expectations. A real estate agent may then propose an adjustment to their expectation and strategize a price based on buyer interest or lack thereof.

SUMMARY

A method for determining a sale price for a subject real estate listing according to one disclosed non-limiting embodiment of the present disclosure includes receiving data regarding a subject real estate listing from a handheld device operating a predictive showing change application; comparing the data regarding the subject real estate listing with a multiple of comparable real estate listings; and determining an output that compares a number of showings for a suggested price of the subject real estate listing compared to a number of showings based on the multiple of comparable real estate listings.

A further aspect of the present disclosure includes determining the output based on an average number of showings of the multiple of comparable real estate listings.

A further aspect of the present disclosure includes wherein the receiving data regarding the subject real estate listing includes receiving a current price for the subject real estate listing.

A further aspect of the present disclosure includes wherein the receiving data regarding the subject real estate listing includes receiving the suggested price via a slider bar on the handheld device.

A further aspect of the present disclosure includes wherein the receiving data regarding the subject real estate listing includes pulling MLS data.

A further aspect of the present disclosure includes displaying the output in an interactive manner.

A further aspect of the present disclosure includes displaying the output as a graph.

A further aspect of the present disclosure includes wherein the graph includes a line graph based on the current price over a time period.

A further aspect of the present disclosure includes wherein the graph includes a line graph based on the suggested price over a time period.

A further aspect of the present disclosure includes wherein the graph includes a line graph representing a number of showings based on the current price.

A further aspect of the present disclosure includes wherein the graph includes a line graph representing a number of showings based on the suggested price.

A handheld device according to one disclosed non-limiting embodiment of the present disclosure includes a power supply; a memory to store executable instructions for operation of a predictive showings change application; a processor in communication with the memory and the power supply, the processor operable to execute the executable instructions to receive data regarding a subject real estate listing and a multiple of comparable real estate listings on the predictive showings change application; and a display in communication with the processor, the display configured for displaying an output on the predictive showings change application that compares a number of showings for a suggested price of the subject real estate listing compared to a number of showings based on the multiple of comparable real estate listings.

A further aspect of the present disclosure includes, wherein the executable instructions include executable instruction to display the output in an interactive manner.

A further aspect of the present disclosure includes wherein the executable instructions include executable instruction to display the output as a graph.

A further aspect of the present disclosure includes, wherein the executable instructions include executable instruction to display the output as a line graph that compares the number of showings for the suggested price of the subject real estate listing compared to the number of showings based on the multiple of comparable real estate listings over a time period.

A further aspect of the present disclosure includes wherein the time period is user selectable.

A further aspect of the present disclosure includes wherein the receiving data regarding the subject real estate listing is the current price as input by a user.

A further aspect of the present disclosure includes wherein the receiving data regarding a subject real estate listing is the current price as received by a listing recommendation server.

A further aspect of the present disclosure includes, wherein the receiving data regarding a subject real estate listing is received as input via a slider.

A method for predicting a number of showings for a subject real estate listing, according to one disclosed non-limiting embodiment of the present disclosure includes identifying a subject real estate listing; identifying a multiple of comparable properties to the subject real estate listing; determine showings associated with the multiple of comparable properties; comparing an average number of showings for the multiple of comparable properties to a number of showings of the subject property at a current price; and predicting a number of showings for the subject property based on the average number of showings for the multiple of comparable properties for a suggested price.

A further aspect of the present disclosure includes receiving specific filters to identify the multiple of comparable properties.

A further aspect of the present disclosure includes, wherein the receiving specific filters to identify the multiple of comparable properties includes selecting filters from MLS data.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
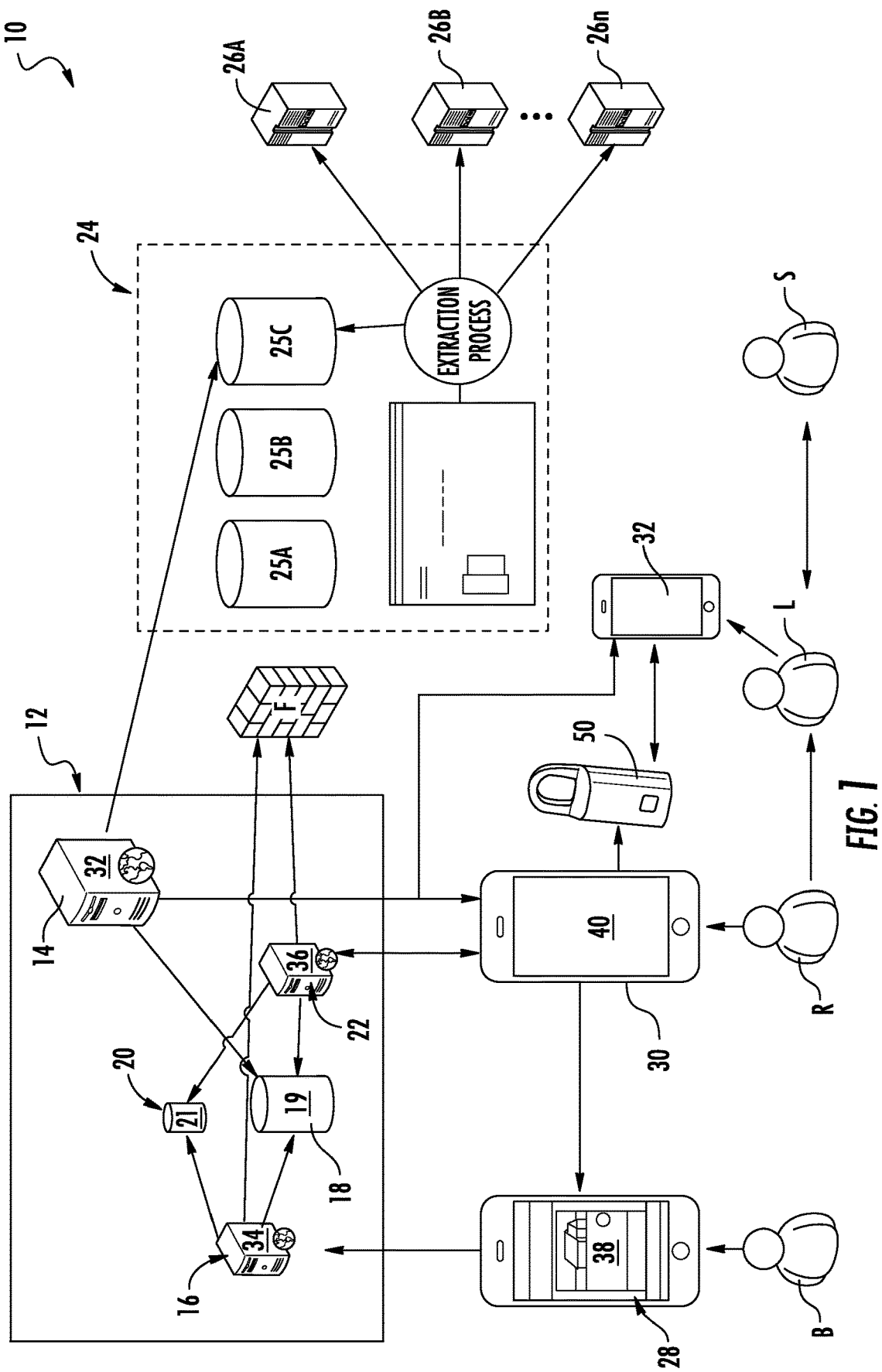
FIG. 1 is a general schematic system diagram of a real estate application system.

FIG. 1 schematically illustrates a system 10 to facilitate communication for real estate transactions. A showing agent "R" has a fiduciary duty to a home buyer "B" while a listing agent "L" has a fiduciary duty to a home seller "S." The showing agent "R" typically shows the property to the home buyer "B." The listing agent "L" typically communicates with the buyer "B" only indirectly, such as by communication with the showing agent "R" who then communicates information to and from the buyer "B." Although only particular agents are referred to in the illustrated embodiments, the functions of such personnel may be otherwise assigned or rearranged. For example, the listing agent "L" may utilize a seller's assistant.

Showing information is accessible through the system 10 so that the listing agent "L" can generate reports for their seller "S", send updates about a particular listing to showing agents "R" who recently showed that listing, or provide feedback from a showing. The feedback may also include data generated by an electronic key box 50 that occurs as a function of the showings, such as number of showings, time spent at the subject property, return showings, etc. Listing agents "L" may also use the system 10 to receive automatic notification (e.g., email notices) when a showing occurs at their listings. The buyer "B" may also benefit as the system 10 provides a central repository for buyer information (e.g., details of each home the buyer has viewed).

The system 10 generally includes a subsystem 12 that may be controlled by a single owner. The subsystem 12 generally includes a listing recommendation server 14, a buyer server 16, a buyer database system 18, a log database system 20, and an electronic key server 22. A multiple of handheld devices 28, 30, 32, communicate with the subsystem 12. The first handheld device 28 is herein associated with the potential buyer "B," the second handheld device 30 is associated with the showing agent "R" and the third handheld device 32 is associated with the listing agent "L."

"Server" conveys its customary meaning and further includes a corporate datacenter that provides service and/or data connection, e.g., to the handheld device and/or an electronic locking device. "Handheld device" refers to a portable electronic device that is at least configured to send messages to, and/or receive messages from the listing recommendation server 14 over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. In addition, the handheld device is typically also configured for short-range wireless communications.

The listing recommendation server 14 communicates with the buyer database system 18, the log database system 20, and a data center 24. The buyer database system 18 includes a database 19 that stores rating and notes taken by the buyer "B," and the log database system 20 includes a database 21 that collects activity data. The data center 24 may host one or more servers that may include, but not be limited to, a database for managing key holders 25A, a security database 25B that hosts security protocols, and a listing database 25C that stores extracted real estate listings from external servers 26A, 26B, 26N.

The data center 24 communicates with the external data servers 26A-26N such as a Real Estate Transaction Standard (RETS) framework that stores MLS data. The MLS data includes information such as number of bedrooms, number of bathrooms, price of listing, etc. RETS is a framework that can be adopted by computer systems to receive data from the Multiple Listing Service (MLS) servers, as well as those of other real estate systems provided they also have software installed designed to communicate using the RETS framework. The National Association of Realtors refers to RETS as a "common language." The data center 24 may also host real estate servers including a database for managing key box inventories, a security database that houses security protocols, a listing database of property listings, and/or other databases.

The listing recommendation server 14 hosts, for example, at least an analytics software application 32 that compiles and runs analytics against buyer ratings and MLS listing data from the data center 24. The buyer server 16 hosts a buyer application program interface (API) 34, and the electronic key server 22 hosts an electronic key API 36. An application program interface (API) is a set of routines, protocols, and tools for building software applications. An API specifies how software components should interact. APIs are used when programming graphical user interface (GUI) components. A server-side web API is a programmatic interface consisting of one or more publicly exposed endpoints to a defined request-response message system The listing recommendation server 14 communicates with a real estate application 38 on the handheld device 28 through the buyer API 34 and buyer database system 18. An agent application 40 on the handheld device 30 communicates with the listing recommendation server 14 and the electronic key server 22. The buyer API 34 and the electronic key API 36 also communicate with the data center 24 through a firewall "F" or other security protocol.

The real estate application 38 may be a mobile application that may be used by the home buyer "B" to rate the properties they have seen via, for example, recordation of feedback and cataloging of the properties of interest. The real estate application 38 communicates with the buyer database system 18 through the buyer API 34 which then stores the ratings and notes taken by the home buyer in the buyer database system 18.

The agent application 40 may be a mobile application that may be used by the showing agent "R" to access the electronic key boxes 50. The electronic key API 36 communicates with the agent application 40 to sync activity from the electronic key boxes 50 to the electronic key API 36 (e.g., key boxes the key has opened), and showing notifications (e.g., messages about accessed key boxes and associated showing agent "R").

Figure 2:
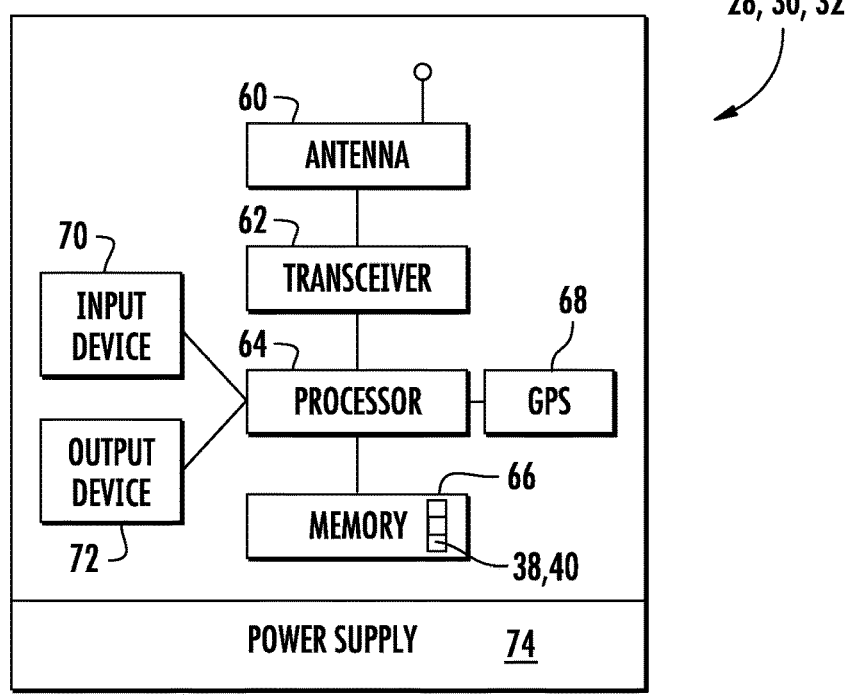
FIG. 2 is a schematic diagram of a handheld device.

With reference to FIG. 2, each handheld device 28, 30, 32, generally includes a handheld device antenna 60, a handheld device transceiver 62, a handheld device processor 64, a handheld device memory 66, a GPS module 68, an input device 70, a display 72, and a handheld device power supply 74. The handheld device processor 64 may be any type of microprocessor having desired performance characteristics. The handheld device memory 66 may include any type of computer readable medium that stores the data and executable instructions described herein below. The executable instructions may be stored or organized in any manner and at any level of abstraction, such as in connection with one or more applications, processes, routines, procedures, methods, etc. The handheld device transceiver 62 is a transceiver of a type corresponding to the transceiver 62 and the handheld device antenna 60 is a corresponding antenna.

Figure 3:
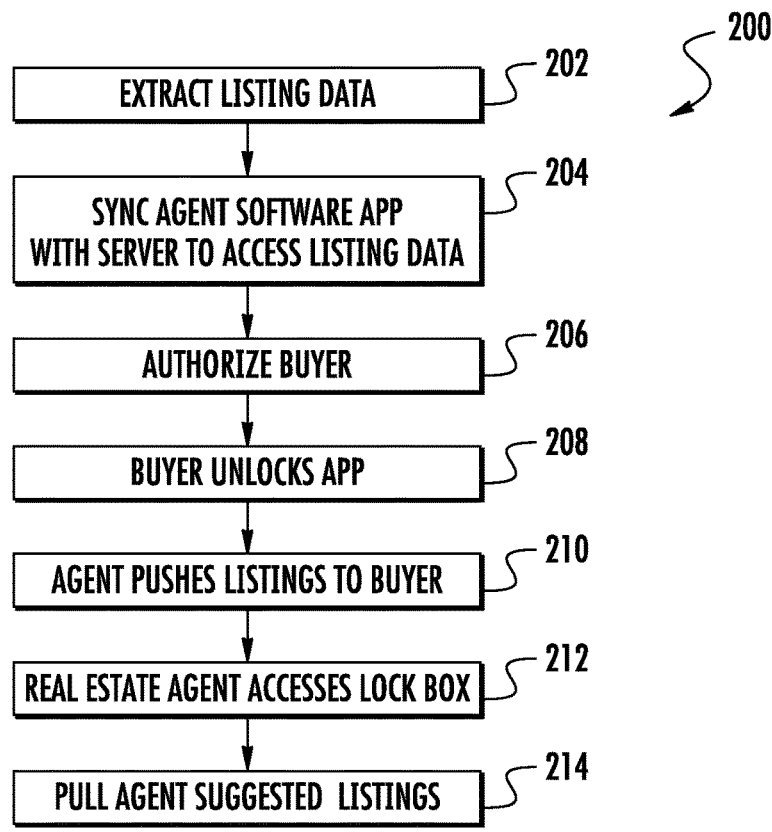
FIG. 3 is a flowchart of a method to provide communication for a real estate transaction with the system of FIG. 1.

With reference to FIG. 3, a method 200 for operation of the system 10 is disclosed in terms of functional block diagrams. The functions are programmed software routines capable of execution in various microprocessor based electronics control embodiments and represented herein as block diagrams.

Initially, the owner of the subsystem 12 may have agreements with MLS to extract (202) MLS data from the external data servers 26A-26N into the listing recommendation server 14. Next, the agent application 40 syncs (204) with the listing recommendation server 14 and pulls MLS data for desired listings. This may be performed through an automated sync through the agent application 40. The showing agent "R" may also do a manual sync to obtain updated MLS data.

Through the agent application 40, the showing agent "R" can authorize (206) the home buyer "B" to access the desired listings of interest to the buyer "B". Through the agent application 40, the showing agent "R" authorizes the buyer "B" through input of buyer identification information (e.g., name and email address.) The buyer identification information is then synced with the listing recommendation server 14. The listing recommendation server 14 then communicates with the buyer "B" (e.g., via email) that can include a link to an app store and a code to unlock (208) the real estate application 38. The buyer "B" is then authorized to download the real estate application 38 and desired listings, or to maintain the value of the showing agent "R" in the real estate transaction.

Figure 4:
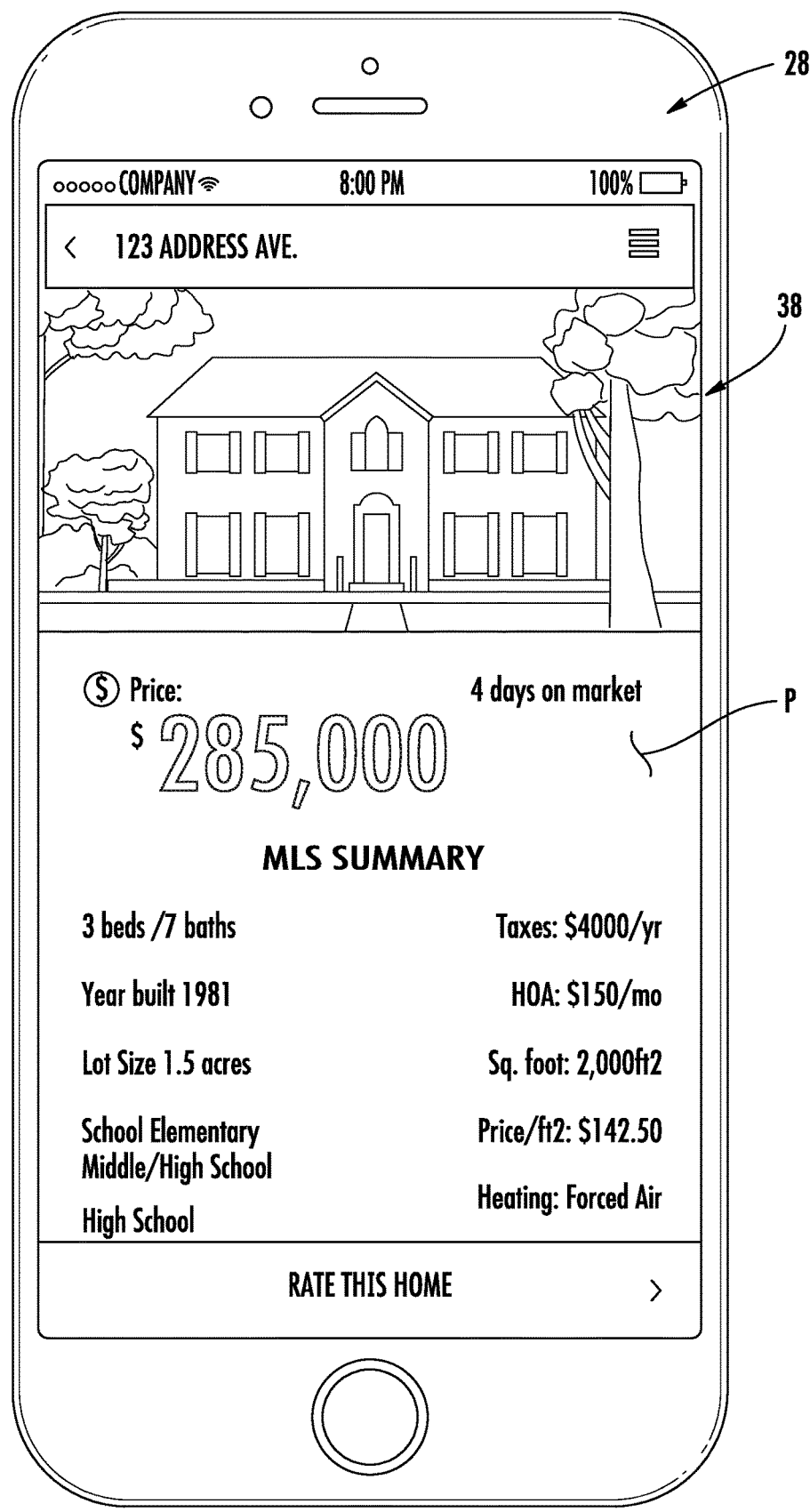
FIG. 4 is a screenshot of the real estate application property listing view.

Through the agent application 40, the showing agent "R" can continue to push (210) listings to the real estate application 38. Access may be provided for one or more properties by a showing code, or other link to unlock one or more features in the real estate application 38. The showing agent "R" is able to selectively push properties (one example property illustrated by screenshot "P"; FIG. 4) to be viewable within the real estate application 38. The showing agent "R" also uses the agent application 40 to operate the electronic key box 50 to access the property for showing to the buyer "B."

Figure 5:
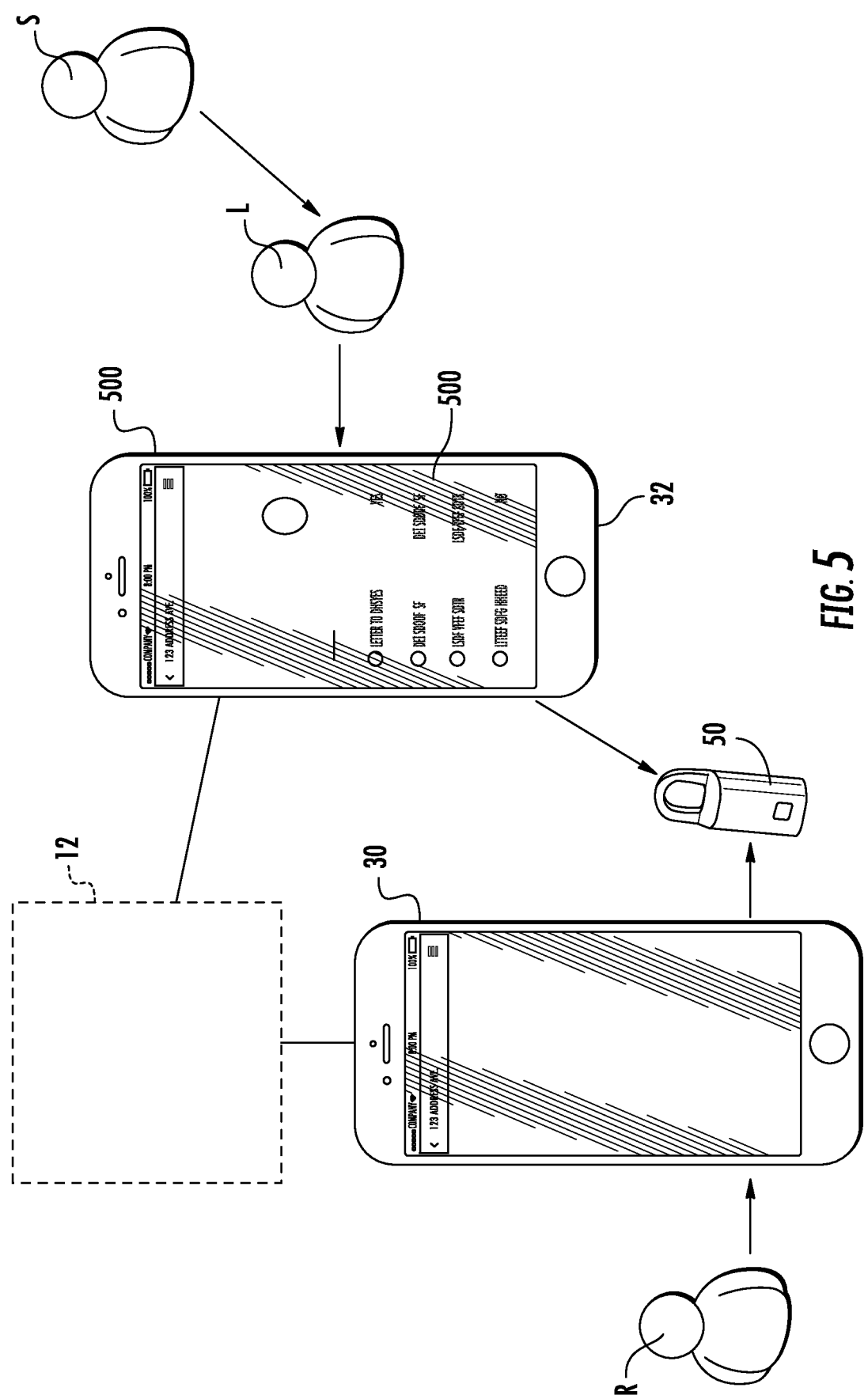
FIG. 5 is a schematic system diagram of a portion of the real estate application system.

With reference to FIG. 5, in addition to the features discussed above, the listing agent "L" can utilize a predictive showing change application 500 on their handheld device 32 to facilitate setting or adjusting a price for a subject property.

The predictive showings change application 500 may be a separate application and/or a portion of the agent application 40.

Figure 6:
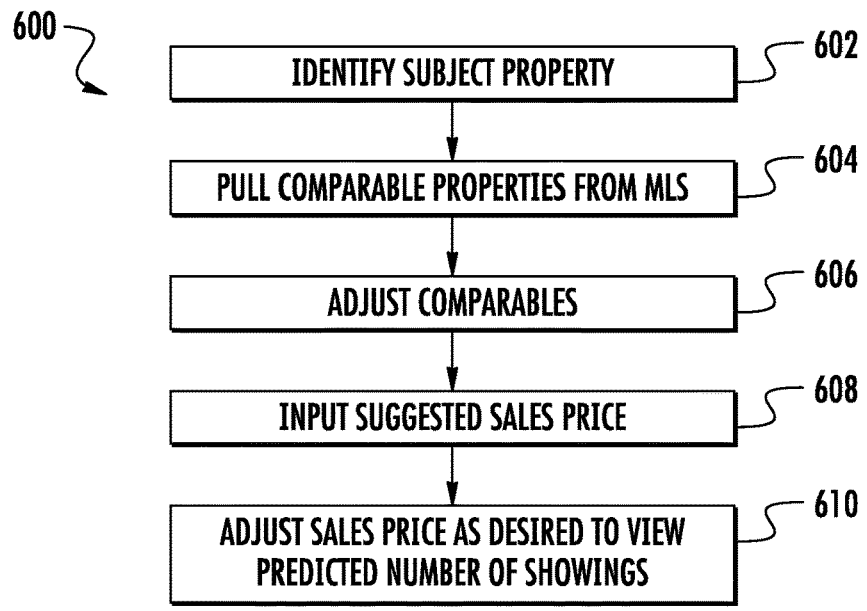
FIG. 6 is a flowchart of a method to predict and adjust a price with regard to showing from a home seller's or seller agent perspective using a predictive showing change application.

With reference to FIG. 6, a method 600 for setting or adjusting a sale price based upon an interactive presentation of predicted showings based upon showing data from comparable properties utilizing the predictive showings change application 500 in terms of functional block diagrams.

Initially, a user utilizes the predictive showings change application 500 to identify (602) the subject property. The predictive showings change application 500 communicates with the listing recommendation server 14 to obtain historical MLS data for the subject property.

Figure 7:
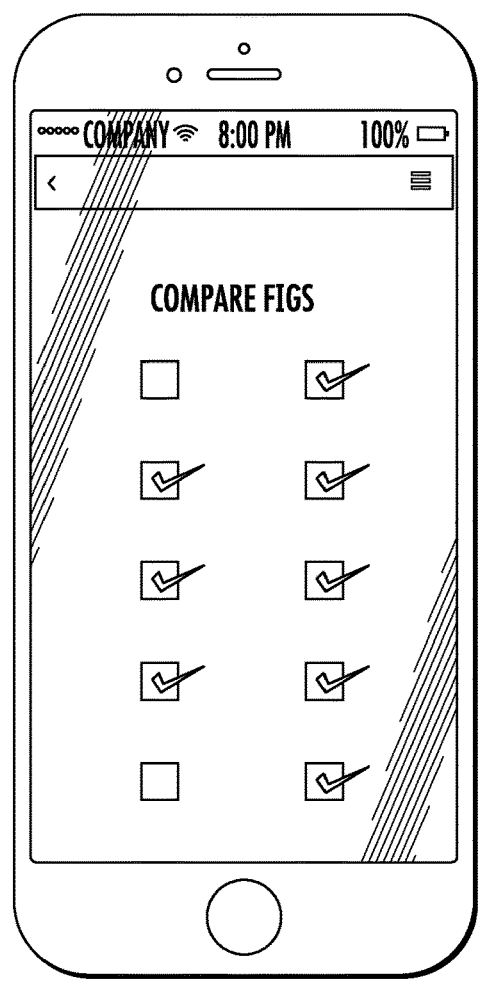
FIG. 7 is a screenshot of input filters to determine a comparable property.

In response to the subject property, the predictive showings change application 500 pulls (604) comparable properties from the listing recommendation server 14. The comparable properties may be adjusted by the user on the predictive showings change application 500 by, for example, selecting or deselection particular filters 530 (e.g., area, price, class, status, bedrooms, bathrooms, garage, fireplaces, basement, etc.; FIG. 7) which adjust (606) the comparable properties. The filters may be utilized to define the search of comparable properties.

Next, a current price 506 for the subject property is identified (608). The current price 506 can be identified either manually, or automatically based on the MLS data for the subject property.

Figure 8:
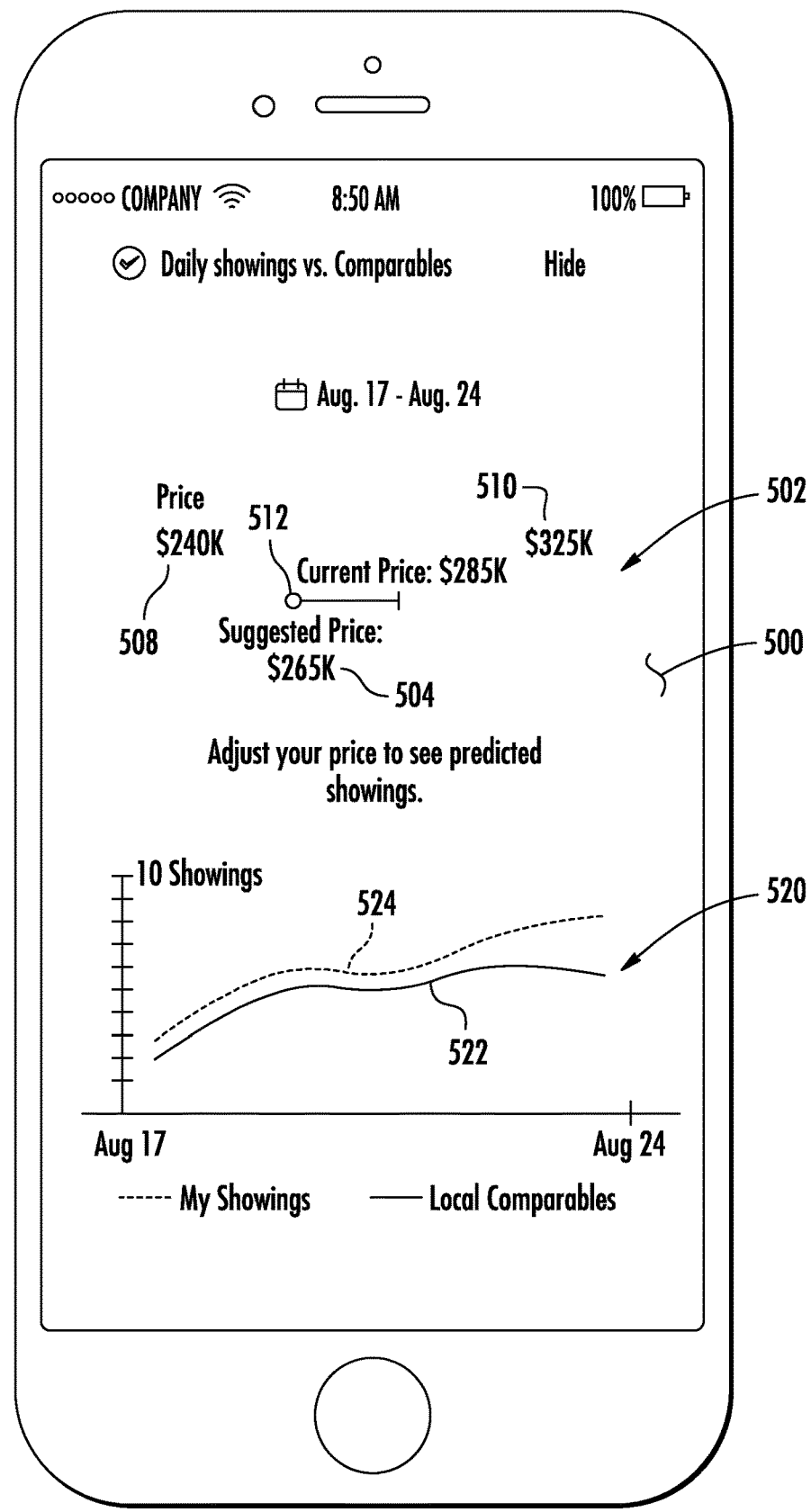
FIG. 8 is a screenshot of a predictive change interface for display on a handheld device.

With reference to FIG. 8, the current price 506 may be displayed on the predictive showings change application 500 on an input 502 (e.g., a slider bar). The input 502 may be operated in an interactive manner to also identify a suggested price 504 (e.g., 265K) in comparison to the current price 506 (e.g., 285K). That is, the suggested price 504 may be an anchor from which a slider is moved to define the suggested price 504. The input 502 may include endpoints 508, 510 that provide a scale to the input 502 to facilitate perspective as the slider 512 is moved along the input 502 to define the suggested price 504.

The predictive showings change application 500 then displays an output 520 that compares a number of showings 522 for the suggested price 504 as compared to a number of showings 524 based on the comparable properties. The output 520 is rendered in essential real-time in response to movement of the slider 512 that represents the suggested price 504.

The number of showings 524 on the comparable properties may be determined by averaging the historical data of showings on the comparable properties over a time period. The number of showings 522 for the suggested price 504 may, in one embodiment, be determined by extrapolating from the historical data of the number of showings 524 on the comparable properties as adjusted by the price of the comparable properties compared to the number of showings within the MLS data.

The graphical representation of the output 520 may, in one embodiment, be shown as line graphs over a period of time (e.g., a week, August 17-August 24) to illustrate differences in showings based on the days of the week. For example, showings often increase over the weekend as well as certain times of the year. The differences in the number of showings that would thus otherwise bias the showing data are thereby accounted for. The graphical representation of the output 520 may additionally permit adjustments to the time-period as well as selection of a future date or range of dates. For example, the dates may be selected so that a number of showings may be predicted for a future date.

Figure 9:
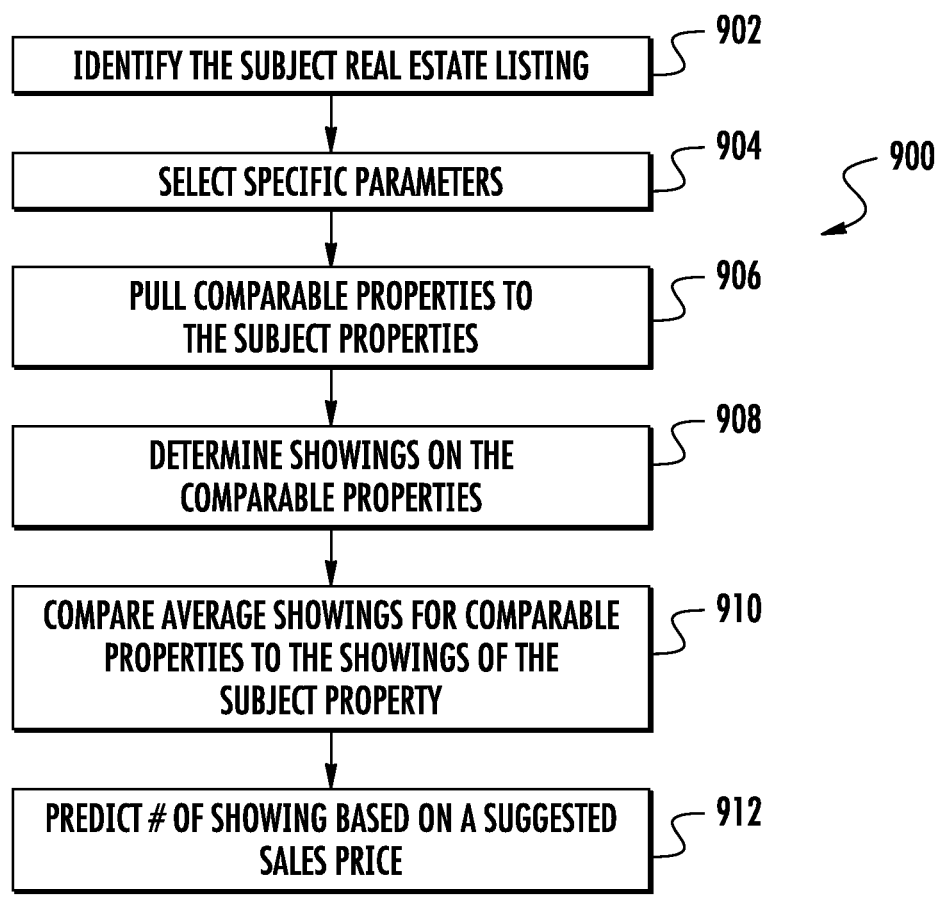
FIG. 9 is a flowchart of a method of operation of the predictive showing change application.

With reference to FIG. 9, a method 900 of operation of the predictive showings change application 500 is disclosed in terms of functional block diagrams. The functions are programmed software routines and executable instructions capable of execution in various microprocessor based electronic control embodiments and represented herein as block diagrams.

Initially, data identifying (902) the subject real estate listing is communicated to the system 10. Next, specific filters which may be utilized as search filters for comparable properties are selected (904), (e.g., area, price, class, status, bedrooms, bathrooms, garage, fireplaces, basement, etc.) Next, the predictive showings change application 500 pulls (906) comparable properties from the listing recommendation server 14 based on the selected filters (FIG. 7).

Then, a number of showings for each of the comparable properties are determined (908) from the historical data in the listing recommendation server 14, parsed into activity per period of time (e.g., a week) then averaged. The average showings for the comparable properties is then used for comparison (910) to the showings of the subject property.

Then, based on a desired change in the current price to obtain the suggested price, a number of showings is predicted based on the suggested price (912). That is, the difference between the current price and the suggested price is used by the predictive showings change application 500 to determine a predicted number of showings for the suggested price based on the comparable properties.

The predictive showings change application 500 allows a home seller to predict the optimized price, predict the best time to change the price and predict the best day-of-week to change the price which increases the effectiveness of real estate agents. Further, the predictive showings change application 500 facilitates determination if the subject property is not performing as expected. For example, if a house is being showed a lot, but no one is buying—why? If the house is having less showings than it should, perhaps it is priced too high.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method for determining a sale price for a subject real estate listing to produce an estimated number of showings in a period of time, comprising:
   transmitting activity data from an electronic key box of a subject property to a handheld device of a showing agent via a short distance communication standard;
   synchronizing the transmitted activity data of the handheld device of the showing agent with an electronic key server, comprising a database storing showing data, for updating the database;
   receiving the showing data regarding a subject real estate listing from the electronic key server and historical MLS data from a listing recommendation server;
   receiving data regarding a subject real estate listing from a handheld device operating a predictive showing change application, wherein the receiving data regarding the subject real estate listing comprises receiving a current price for the subject real estate listing and filters to use for selecting comparable real estate listings;
   comparing the received data and the filters with a multiple of real estate listings to identify a multiple of comparable real estate listing;
   determining an output as a relationship between a number of showings over a period of time and listing price for the multiple of comparable real estate listings based on the received data;
   defining a slider bar on the handheld device, wherein the slider bar is based on the listing price between upper and lower endpoints;
   receiving a suggested listing price for the subject real estate listing via the slider bar on the predictive showing change application;
   determining, based on the relationship, an estimated relationship between an estimated number of showings of the subject real estate listing over the period of time and a corresponding price;
   and displaying an output on the handheld device as a graph representing the estimated number of showings over the period of time at the suggested listing price determined from the estimated relationship.

2. The method as recited in claim 1, further comprising determining the output based on an average number of showings of the multiple of comparable real estate listings.

3. The method as recited in claim 1, wherein the receiving data regarding the subject real estate listing includes pulling MLS data.

4. The method as recited in claim 1, further comprising displaying the output in an interactive manner.

5. A system for determining a sale price for a subject real estate listing for a subject property, comprising:
a multiple of electronic key boxes;
an electronic key server in communication with the multiple of electronic key boxes via a handheld device of a showing agent via a long-range communication standard, the electronic key server including a database that stores showing data associated with the multiple of electronic key boxes and that synchronizes activity data received from the handheld device of the showing agent in communication with an electronic key box of a subject property via a short distance communication standard for updating the database;
a buyer server hosting a buyer application program interface that receives a subject property, the buyer server in communication with the electronic key server;
a buyer storage system in communication with the buyer server and the electronic key server, the buyer storage system including a database that stores buyer feedback regarding a real estate property;
a listing recommendation server hosting an analytics software application that determines a set of buyers based on the subject property, and compares a feedback rating on the subject property and a feedback rating on at least one comparable property to determine a competitive interest in the subject property in response to the set of buyers and the at least one comparable property for communication to a predictive showings change application;
a handheld device running the predictive showings change application operable to execute executable instructions for:
receiving the showing data regarding a subject real estate listing from the electronic key server and historical MLS data from the listing recommendation service, wherein the receiving data regarding the subject real estate listing further comprises receiving a current price for the subject real estate listing and filters to use for selecting comparable real estate listings, said filters being used by the listing recommendation server to identify a multiple of comparable real estate listings;
displaying on the handheld device a slider bar based upon the current price between upper and lower endpoints;
receiving a suggested price via the slider bar on the predictive showing change application;
determining an output as an estimate of a number of showings for the suggested price of the subject real estate listing based upon a relationship between price and a number of showings of the multiple of comparable real estate listings based on the received data;
and displaying the output as a graph displaying the estimate of a number of showings at the suggested price over a time period.

6. The system as recited in claim 5, wherein the executable instructions include executable instruction to display the output in an interactive manner.

7. The system as recited in claim 5, wherein the executable instructions include executable instruction to display the output as a graph.

8. The system as recited in claim 5, wherein the executable instructions include executable instruction to display the output as a line graph that compares the number of showings for the suggested price of the subject real estate listing compared to the number of showings based on the multiple of comparable real estate listings over a time period.

9. The system as recited in claim 8, wherein the time period is user selectable.

10. The system as recited in claim 5, wherein the receiving data regarding the subject real estate listing is the current price as input by a user.

11. The system as recited in claim 5, wherein the receiving data regarding a subject real estate listing is the current price as received by a listing recommendation server.

12. The system as recited in claim 5, wherein the receiving data regarding a subject real estate listing is received as input via a slider.

13. A method for predicting a number of showings for a subject real estate listing, comprising:
transmitting activity data from an electronic key box of a subject property to a handheld device of a showing agent via a short distance communication standard;
synchronizing the transmitted activity data of the handheld device of the showing agent with an electronic key server, comprising a database storing showing data, for updating the database;
identifying a subject real estate listing;
receiving specific filters to identify properties that are comparable to the subject real estate listing;
identifying a multiple of comparable properties to the subject real estate listing using the specific filters;
receiving the showing data regarding a subject real estate listing from the electronic key server and historical MLS data from a listing recommendation server;
receiving data regarding the subject real estate listing from a handheld device operating a predictive showing change application, wherein the receiving data regarding the subject real estate listing comprises receiving a current price for the subject real estate listing;
receiving a suggested price via a slider bar on the predictive showing change application, wherein the slider bar is displayed on the predictive showing change application showing the current price between upper and lower endpoints;
comparing an average number of showings for the multiple of comparable properties to a number of showings of the subject real estate listing at a current price based on the received data;
predicting an estimated number of showings for the subject real estate listing at the suggested price based on the average number of showings for the multiple of comparable properties;
and displaying an output as a graph representing the estimated number of showings based on the current price and the suggested price over a time period.

14. The method as recited in claim 13, wherein the receiving specific filters to identify the multiple of comparable properties includes selecting filters from MLS data.

15. The method as recited in claim 1, wherein the predictive showings change application determines if the subject real estate listing is not performing as well as the comparable properties.

16. The system as recited in claim 5, wherein a number of showings for each of the comparable properties are determined from historical data in the listing recommendation server, parsed into an activity per period of time then averaged, the average showings for the comparable properties is then compared to the showings of the subject property.

17. The system as recited in claim 16, wherein the predictive showings change application pulls comparable properties from the listing recommendation server.

18. The system as recited in claim 17, wherein the comparable properties are adjustable by the user on the predictive showings change application by selecting or deselection particular filters.

\* \* \* \* \*